(12) United States Patent
Blatt et al.

(10) Patent No.: US 6,816,585 B1
(45) Date of Patent: Nov. 9, 2004

(54) METHOD FOR ROUTING IN LOADED TELECOMMUNICATION NETWORKS

(75) Inventors: Marcelo Blatt, Modi'in (IL); Noga Peled, Raanana (IL)

(73) Assignee: ECI Telecom Ltd., Petach Tikva (IL)

( * ) Notice: Subject to any disclaimer, the term of this patent is extended or adjusted under 35 U.S.C. 154(b) by 544 days.

(21) Appl. No.: 09/889,387

(22) PCT Filed: Nov. 19, 2000

(86) PCT No.: PCT/IL00/00767

§ 371 (c)(1),
(2), (4) Date: Jul. 16, 2001

(87) PCT Pub. No.: WO01/43373

PCT Pub. Date: Jun. 14, 2001

(30) Foreign Application Priority Data

Dec. 7, 1999 (IL) ................................. 133352

(51) Int. Cl.[7] ............................................... H04M 7/00

(52) U.S. Cl. .......................... 379/221.03; 379/114.02; 379/221.01; 379/272; 379/273

(58) Field of Search ..................... 379/114.02, 221.01, 379/221.03, 272, 273, 909, 112.02, 112.08

(56) References Cited

U.S. PATENT DOCUMENTS

| | | | | |
|---|---|---|---|---|
| 4,284,852 A | * | 8/1981 | Szybicki et al. | 379/221.01 |
| 4,991,204 A | * | 2/1991 | Yamamoto et al. | 379/221.01 |
| 5,130,982 A | * | 7/1992 | Ash et al. | 370/352 |
| 5,142,570 A | * | 8/1992 | Chaudhary et al. | 379/221.07 |
| 5,402,478 A | | 3/1995 | Hluchyj et al. | |
| 5,978,730 A | | 11/1999 | Poppen et al. | |
| 6,023,501 A | * | 2/2000 | Wakamatsu | 379/114.02 |
| 6,389,128 B1 | * | 5/2002 | Stademann | 379/221.01 |
| 6,487,289 B1 | * | 11/2002 | Phan et al. | 379/243 |
| 6,519,337 B1 | * | 2/2003 | Koo et al. | 379/333 |

FOREIGN PATENT DOCUMENTS

| | | |
|---|---|---|
| EP | 0 753 979 A1 | 1/1997 |
| EP | 0 830 047 A2 | 3/1998 |
| WO | WO 99/33232 A2 | 7/1999 |

OTHER PUBLICATIONS

Lee W C et al.: "Routing Subject to Quality of Service Constraints in Integrated Communication Networks" IEEE Network, IEEE Inc. vol. 9, No. 4, Jul. 1, 1995, pp. 46–55, XP000526591.

Tode H et al.: "A Routing Method Using a Tunable Cost Function to Obtain Required Communication Quality and Performance" Electronics & Communication in Japan Part I vol. 81, No. 5, May 1, 1998, pp. 30–40, XP000752589.

(List continued on next page.)

Primary Examiner—Bing Q. Bui
(74) Attorney, Agent, or Firm—Browdy and Neimark, P.L.L.C.

(57) ABSTRACT

A method for routing of incoming prioritized telecommunication traffic in a telecommunication network by applying an algorithm of finding optimal path to an augmented graph built for said telecommunication network. The telecommunication network is represented as a network graph comprising nodes (A, B, C, D, E) and real links (AB, BC, CD, ED, AE) bridging the nodes, while the augmented graph is a graph built on the basis of the network graph by adding to it virtual links (ABC1, . . . , EDC3). The augmented graph comprises nodes and edges, wherein the edges of the augmented graph are weighed to reflect priority of the telecommunication traffic presently taking place there-through. For placing a new call according to the method, a pathfinder optimization algorithm is applied to the augmented graph to determine an optimal pathfinder solution, having the minimal total weight, for routing the new call in the augmented graph. When the optimal pathfinder solution is determined, links in the network graph corresponding to the solution can be allocated for real routing, and the augmented graph can be updated to reflect changes in the network.

15 Claims, 2 Drawing Sheets

OTHER PUBLICATIONS

Peyravian M et al.: "Decentralized Network Connection Preemption Algorithms", Computer Networks and ISDN Systems, NL, North Holland Publishing Amsterdam, vol. 30, No. 11, Jun. 22, 1998, pp. 1029–1043, XP004131748.

Barberis G et al.: "A Shortest Route Algorithm for Graphs Having Weighted Nodes and Arcs with Application to S/F Communication Networks" CSELT Rapporti Technici, IT, Turin, vol. 5, No. 1, Mar. 1977, pp. 63–66, XP000669931.

Craveirinha et al., "Application of the Product Graph to a Large Multiexchange Digital Network", *IEEE Proceedings*, vol. 136, pt. 1, No. 3, pp. 189–196 (Jun. 1989).

* cited by examiner

METHOD FOR ROUTING IN LOADED TELECOMMUNICATION NETWORKS

REFERENCE TO RELATED APPLICATIONS

The present application is the national stage under 35 U.S.C. 371 of international application PCT/IL00/00767, filed Nov. 19, 2000 which designated the United States, and which international application was published under PCT Article 21(2) in the English language.

FIELD OF THE INVENTION

The present invention relates to a method of routing telephone or data calls in modern telecommunication networks, especially under high traffic load conditions.

BACKGROUND OF THE INVENTION

It is becoming more and more complicated to manage telecommunication networks in today's communication environment due to the growing traffic load. One of the complex tasks of networks management is routing calls having different priorities.

Generally, a telecommunication network such as a TDM based telephone network may be represented as comprising nodes and links. Each node constitutes a transfer point that is typically a network element (NE), for example a Digital Cross Connect device. The links are made up of carrier lines, such as E1/T1 lines for transmitting telephone calls say, from a local exchange to an access network. Routing paths between nodes are typically set up in advance and do not change dynamically. In the telephone network, calls addressed to a destination node are simply assigned to the path that connects the ingress node to the egress node and comprises a number of links.

There are known algorithms for setting up the shortest path between two nodes i.e., the algorithms attempting to allocate the network resources efficiently. One of such algorithms is the Dijkstra's algorithm, which can be used to find the shortest path between any two nodes in a particular system. Such algorithms usually allow for a single weighing factor for each link between the nodes, which factor is typically used to compare relative costs of different transmission links. Mathematically, the so-called "shortest path algorithms" use representations of the network as a graph in which nodes are called "vertices" and links (direct connections between two vertices) are called "edges".

It should be noted that, the traffic in the modern telecommunication networks is typically of different priority levels, which fact is not taken into account in the above-mentioned "shortest path algorithms".

A common situation which usually takes place in telecommunication networks today is the following: a new call having a particular priority arrives and should be routed through the network, while the network is fully loaded with calls having various priorities. Actually, the problem arises when at least a portion of the network, required for a routine routing, appears to be busy. A similar situation may be raised when one of the links of the system fails and its traffic needs to be rerouted. The goal would be to allocate the new demand using the available resources, or in case there is no enough resources—to insert the new call by dropping some traffic.

Different approaches exist of how to define criteria of dropping the traffic in such cases and how to perform the above task based on the criteria defined.

All the traffic is usually divided into streams having different priorities, and each call usually has an associated priority. Every link of the network can be given a current link priority selected according to the traffic passing through the link.

For example, all lower priority links can be selected to form a pool of available links to be processed by the Djiaekstra algorithm. The algorithm will then find the shortest path, and the links forming the shortest path will be reassigned for the new demand (i.e. the existing lower priority traffic will be dropped and the links will handle the higher priority traffic). This can be done per one priority level at a time until a satisfactory solution is found. The method suffers form a number of disadvantages: firstly, it is multistage and secondly- it is far from optimum because of the criteria chosen, i.e., the priorities are taken into account in a straight-forward way. In other words, if a very convoluted path consisting of many low priority links is found, the algorithm will block all these links irrespective of the number of paths involved. However, there might be a solution that blocks few links of a slightly higher priority— but this solution will not be revealed.

SUMMARY OF THE INVENTION

It is therefore the purpose of the present invention to provide a method allowing optimization of routing and rerouting in a network with traffic characterized by various priorities.

Continuing the topic concerning the criteria of dropping part of existing traffic for embedding a new demand in the network, there have been proposed the following three criteria (in the order of decreasing importance). The criteria are formulated for ensuring the result with producing the smallest perturbation to the network having a number of links:

1. Disable call paths (which are also named calls or connections) with the lowest priority first;
2. Disconnect the smallest number of call paths;
3. Chose the shortest path in the network using links which can be freed from calls according to criteria (1) and (2).

In other words, in the ideal situation, it would be desired to only abandon or block traffic of the lowest priority and at minimal number of paths (i.e. minimal number of calls) and links.

In order to take into account all these criteria in the process of routing one or more calls in a telecommunication network, a new method has been proposed by the Inventors.

The new approach is based on applying an algorithm of finding optimal path(s) to an augmented graph built for a telecommunication network, wherein all edges of the augmented graph are weighed to reflect priority of telecommunication traffic presently taking place there-through.

The calls mentioned above (both those forming the telecommunication traffic, and the new ones) should be considered any of the known types of telecommunication transmission including voice, fax, data, etc.

It should be explained that any telecommunication network comprises a plurality of network elements and a plurality of physical connections each bridging a pair of the network elements. A conventional network may be represented as a connected network graph comprising nodes and links, wherein the nodes respectively correspond to the network elements, while the links interconnect said nodes and respectively correspond to the connections physically existing between the network elements of the network.

The augmented graph, in the frame of the present application, should be understood as a graph built on the basis of the network graph having nodes and real links, by adding to it virtual links; both real and virtual links being considered edges of the augmented graph. The maximal form of the augmented graph is a complete graph where each two nodes are connected by an edge. While weights of the real links reflect real telecommunication traffic presently taking place there-through, weights of the virtual links in the augmented graph are to reflect virtual telecommunication traffic (for purposes which will become apparent from the following description).

In other words, the method of routing calls having priorities in a telecommunication network comprises the following steps:

building an augmented graph of the network, the augmented graph comprising nodes and edges;

weighing each edge of the augmented graph to reflect the priority of calls presently taking place there-through;

obtaining one or more new calls, each defined by end-point nodes and a particular priority;

applying a pathfinder optimization algorithm to the augmented graph to determine an optimal pathfinder solution, having the minimal total weight, for routing said one or more new calls in the augmented graph (in other words, determining optimal path(s));

if said optimal pathfinder solution is determined, allocating corresponding to it links in the network graph for routing the one or more new calls in the telecommunication network;

providing for placing said one or more new calls via the allocated links by ensuring that, if necessary, call(s) having lower priorities and currently held by the allocated links be dropped therefrom, updating the augmented graph on changes whenever take place in the network, and returning to the step of obtaining one or more new calls.

The above-mentioned changes, which may take place in the network, may include at least one, selected from the following non-exhaustive list comprising:

adding said one or more new calls routed via one or more links, dropping said one or more of previously held calls due to placing said one or more new calls (both adding and dropping calls alters priorities and weights of the edges), terminating currently existing calls (which will turn priorities of the corresponding edges to "0" as will be explained below), a failure in the network, such as a link or node outage which causes distortion in the graph and requires rerouting of thus dropped calls, reconsidering the length parameter of the links (which may also alter weights of the edges, as will be explained below).

Naturally, calls that are to be rerouted due to failure of any network element such as a link, a port or even an entire node may be considered to be new calls, and processed according to the method.

In the most preferred version of the method, the step of building the augmented graph includes building of an optimal augmented graph by defining chains of nodes (call paths) respectively used by each of the calls currently taking place in the network, and converting said chains into complete sub-graphs, wherein each two nodes of any of said complete sub-graphs are connected with an edge. Preferably, the weighting is performed to also reflect a so-called length parameter of the edges. In a real network, the length parameter may be a function of at least one argument associated with a link, for example of distance, tariff, administrative cost, etc.

The inventive approach can be applied both to cases where one new call is routed at a time, and to those where a plurality of new calls are simultaneously routed. For example, in the latter case, the pathfinder optimization algorithm is a multi-commodity algorithm.

However, for the sake of simplicity, the following description will preferably refer to the method dealing with one new call at a time.

In this case, the pathfinder optimization algorithm constitutes a shortest path algorithm, and the optimal solution is the shortest path between said end-point nodes, said shortest path comprising one or more edges and being characterized by the minimal weight and the priority lower than that of the new call.

Weight of the shortest path is a sum of weights of the component edges. Rules of defining weights of edges in the augmented graph will become apparent from the description, which follows below. Priority of the shortest path in the augmented graph is considered to be the maximal among the priorities based on which the weights of the component edges have been calculated. In other words, the priority of any of the edges and, consequently, of the network links forming the shortest path should be lower than the priority of the new call. The physical meaning of such a condition is that a new call, which might only be placed in the network by dropping one or more calls having the same priority, should be dropped itself.

Empirically, the advantages of the method may be explained as follows: when constructing the augmented graph based on the physical links associated with "priority and length" weights, edges of the augmented graph will bear full information on the current traffic priorities via various possible paths through the graph. When seeking for the optimal pathfinder solution (e.g., the shortest path) on the augmented graph, such information enables obtaining a single-stage universal solution which will take into account and minimize both the priorities of the calls currently participating in the shortest path, and the physical length of the shortest path. The only thing remaining to do is converting the obtained solution into a real path in the existing network's graph.

Preferably, in the method, the lower priorities are designated with smaller numbers, and the absence of traffic is designated with the smallest number (for example, the "0" priority i.e., the edge is available for routing a new call). According to such logic, the less intensive and less significant the traffic via an edge, the smaller the priority and weight of the edge. It also should be kept in mind that real links may be capable of conducting more than one call at a time, say, by using a multiplexing technology. Capacity C of a real link is equal to the number of calls the link is able to hold simultaneously. If capacity of a real link is not saturated (i.e., one or more calls still may be routed there-through), the priority of the edge corresponding to the link is considered to be "0".

In the circumstances when the network is not fully loaded, the above-proposed method will successfully perform the conventional routing by simply finding a path consisting of edges where the priorities are designated as "0". It is understood, that the allocated physical path in the network will serve as the final result of the routing, since the new call can just be passed through the available path without any problems, i.e., without dropping any calls.

In case the network is loaded (i.e. no path with "0" priority can be found for a new call (as well as in case any link in the loaded network fails and its traffic should be rerouted via the remaining links), the determined shortest path should be considered the one its traffic to be dropped for placing the new call.

In order to describe the inventive method in greater detail, the particular steps will be further explained.

Preferably, step a) of building the augmented graph includes the following operations:

building a complete sub-graph for each call path by adding virtual links in order to connect all the node pairs belonging to the same call path and not connected by real links. That is, if we have a call path composed by H nodes, we have to add at most $\frac{1}{8}[(2H-3)^2-1]$ links, since there exist at least (H−1) real links among the ½ H (H−1) possible node pairs. In other words, $$\tfrac{1}{2} H (H-1)-(H-1)=\tfrac{1}{8}[(2H-3)^2-1]$$

The step b) of assigning weights to the edges of the augmented graph can generally be described as determining a current weight W to each edge (whether the link or the virtual link, connecting nodes "x" and "y"), wherein the current weight being considered the minimal weight among component weights of calls passing through the edge; each of the component weights being a function of the respective traffic priority P and the length parameter L of the edge:

$$W_{xy}=\min \{W_{xy}^{C}\},$$

$$W_{xy}^{C}=k*P^{C}+L_{xy}^{C};$$

where:

C—labels the number of calls passing through the edge (either virtual or physical) between nodes x and y, $W_{xy}^{C}$—designates a component weight of a call C over edge x,y, $P^{C}$—indicates the priority of a call C, and $L_{xy}^{C}$—designates the value of length parameter (say, in hops or cost) between nodes "x" and "y", along the path formed by the call C.

k—is a coefficient, preferably for reflecting rules of managing calls with different priorities in the particular network; maximal value of "k" reflects the maximal number of possible calls of priority P in the network.

In particular cases, the step (b) may be accomplished in the following order:

(i)—assigning a current weight W to an edge being a real link between nodes x, y by selecting a minimal weight among weights respectively calculated for all real and possible calls via said link according to its capacity C and the following formula:

$$W(x,y)=\min \{W(x,y)^{call\ 1}, W(x,y)^{call2}, \ldots W(x,y)^{call\ C}\},$$

or $$W(x,y)=\min\{(k*P^{call\ 1}+L),\{(k*P^{call2}+L),\ldots \{(k*P^{call\ C}+L)\};$$

and where:

$P^{call\ i}$—is the priority of a particular call (call 1, call2, . . . or call C) currently taking place (or possible) via the link which forms the edge between the nodes x,y. If call "i≦C" does not exist, its priority will be considered "0".

L—is the length parameter being a function of number h of real links (hops) physically existing between the nodes x,y; (optionally, the length parameter L can also be a function of the edge dimensions d, price s, quality q and other administrative parameters, so that L=f(h, d, s, q . . . ); in the simplest case where no other parameters are considered for a real link being one hop, L=1;

k—as above, is the coefficient preferably reflecting the maximal number of possible calls of priority P in the network, i.e., the total number of node pairs that can be formed, and therefore the maximal number of edges that the network may contain: $k_{max}=½ N(N−1)$, where N is the number of nodes in the network. The coefficient is selected to be rather high to put the major emphasize on the criterion of the traffic priorities. It should be mentioned, however, that the coefficient k may reflect rules which are empirically set for a particular network. For example, the value of "k" may take into account an arbitrary consideration that instead of dropping more than five calls with priority "5" it is preferable to drop up to three calls with higher priority "6";

(ii)—assigning a current weight W to an edge being a virtual link between nodes x, y by selecting a minimal weight among weights respectively calculated for all "n" real calls which continuously pass between nodes x, y via groups of real links enveloping the virtual link:

$$W(x,y)=\min \{W(x,y)^{call\ 1}, W(x,y)^{call\ 2}, \ldots W(x,y)^{call\ n}\},$$

or $$W(x,y)=\min\{(k*P^{call\ 1}+L^{call\ 1}), \{(k*P^{call2}+L^{call2}), \ldots \{(k*P^{call\ n}+L^{call\ n})\};$$

and where:

$P^{call\ i}$—is the priority of a particular call (call i) currently taking place via a group of real links enveloping the virtual edge between the nodes x,y.

$L^{call\ i}$—is the edge length parameter, being a function of number h of real links (hops) physically present in a particular group of links between the nodes x,y via which call i passes; in the simplest case, L=h;

k—as above, reflects the importance of the priority criterion. It can be selected as described above, keeping in mind that $k_{max}=½ N(N−1)$.

Further, step c) of the method (determining the optimal path(s)) can be accomplished as follows:

i) in the basic case where one new call enters the network at a time—by applying any of the known "shortest path" algorithms to determine a path between two end-points s,t, of the new call, which would have the minimal weight:

$$W_{s,t} = \min(\Sigma_s^t W_{x,y});$$

ii) in a general case, where a plurality of new calls enter the network—by applying to the augmented graph a multi-commodity algorithm for determining a respective plurality of paths for the plurality of new calls such that the determined paths have the minimal total weight.

In other words, for the general case the method requires to: minimize $$\Sigma_{ij} f_{ij} W_{ij},$$

subject to the following flow constraint equation:

$$\Sigma_j f_{ij} + \Sigma_j f_{ji} = \begin{cases} \Sigma_s d_{st} & \text{if } i = t \\ \Sigma_t - d_{st} & \text{if } i = s \\ 0 & \text{otherwise} \end{cases}$$

where $\Sigma_{ij}$: sum of all links over the augmented graph;

$f_{ij}$: a flow between node $i$ and node $j$, i.e. calls which enter or leave node $i$;

$W_{ij}$: weight of the link $i-j$ $\Sigma_j f_{ij}$: flows (calls) entering node $i$;

$\Sigma_j f_{ji}$: flows (calls) outgoing node $i$;

$s$: source node $t$: target node $d_{st}$: number of calls between node $s$ and $t$ As a result, one of the following values is obtained for each link in the augmented graph:

$f_{ij}=1$ if the link $(i,j)$ is a part of a path for one of the new calls, and $=0$ if the link $(i,j)$ is not a part of such a path.

Returning to the most illustrative basic case, when the condition $$W_{s,t} = \min(\Sigma_s^t W_{xy})$$

is used in the shortest path algorithm, one can see that the criteria stated for the novel method are satisfied. Keeping in mind that $W_{xy}=\min\{W_{xy}^C\}$, and $W_{xy}^C=k*P^C+L_{xy}^C$, one can see that the minimal path is selected by firstly trying to satisfy the major criterion of minimal priority by selecting the path where edges bear calls with possibly lowest priorities and in any case lower than the priority of the new call. Secondly, in case there exist a number of the paths equally satisfying the major criterion, the length criterion is applied, i.e. the path having the minimal length will be chosen from the selected paths, i.e. the method will produce the minimal perturbation to the network.

As has been mentioned, the augmented graph, once built, is automatically updated when priorities of the traffic change, or physical links or nodes (network elements) fail. It should be emphasized however, that it must not be built from the very beginning for each new incoming call. It is another advantage of the method, that the network represented as the augmented graph becomes solvable and easily updateable.

BRIEF DESCRIPTION OF THE DRAWINGS

The invention will further be described and illustrated with the aid of the following non-limiting drawings, in which.

DETAILED DESCRIPTION OF AN EXEMPLARY EMBODIMENT

Figure 1:
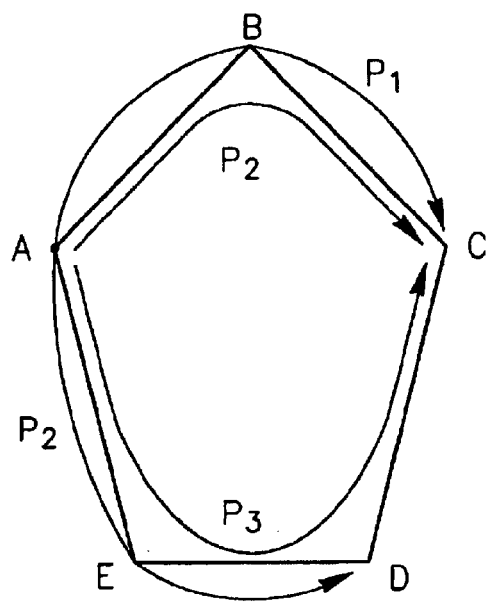
FIG. 1 is a simplified telecommunication network, represented by a network graph, conducting four calls with different priorities.

FIG. 1 illustrates a simplified telecommunication network schematically represented as a connected network graph 10 having five nodes A, B, C, D and E (N=5), and six real links AB, BC, CD, ED and AE. In our simplified example, the network conducts four telephone calls forming four respective call paths. Three calls pass between the end-point nodes A and C and have priorities P1, P2 and P3. The calls with priorities P1 and P2 are routed trough node B, and the call with priority P3 is routed through nodes E and D. Yet another call with priority P2 passes between the nodes A and D via the node E. The P3 priority is considered the highest one. Let us assume that each link is capable of handling up to two calls, i.e., the link capacity C=2 (in practice, C is much more). As can be noticed, most of the links in the network are saturated, and only link CD is still able to perform one connection (i.e. to conduct one call). The priority of this link will therefore be considered as the lowest, "zero" priority.

Let us also assume that the priorities P1, P2 and P3 will respectively be expressed by values 1, 2 and 3. Likewise, the "zero" priority will be valued "0". The coefficient "k" is assumed to be maximal, i.e., is equal to ½ N(N−1)=10.

Figure 2:
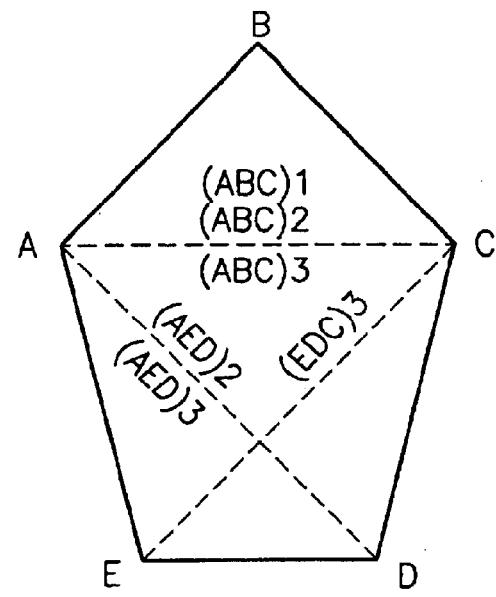
FIG. 2 is an augmented graph of the telecommunication network represented in FIG. 1, comprising virtual links.

FIG. 2 illustrates an example of the augmented graph according to the invention, comprising the network graph complemented with virtual links (shown as dotted lines). The augmented graph is obtained by building a complete sub-graph for each call path, i.e., by adding virtual links connecting all the node pairs belonging to the same call path and not connected by real links. As can be seen in the drawing, the dotted virtual links connect nodes belonging to at least one continuous call (call path). For example, the virtual link AC is built for three continuous calls (call paths), which take place between the nodes AC, namely for:

1) the call with priority P1 passing through node B,
2) the call with priority P2 passing through the same node B, and
3) the call with priority P3 going via nodes E and D. Virtual link AD is introduced both for the call P2 going through node E, and for the call P3 at its continuous portion AED. The virtual link EC serves for the call P3 at its portion EDC.

Figure 3:
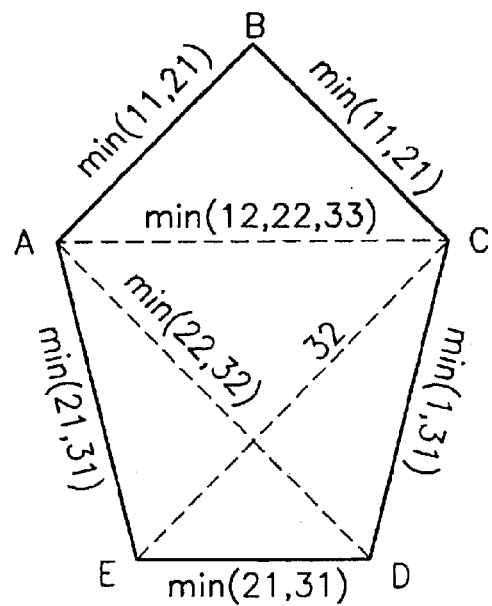
FIG. 3 is the augmented graph of FIG. 2, illustrating how the edges are weighed according to the invention.

FIG. 3 illustrates how weights of real and virtual links are calculated. Keeping in mind that $W_{xy}=\min\{W_{xy}^C\}$, where $W_{xy}^C=k*P^C+L_{xy}^C$, the weight of a real link is the minimal value selected from weights respectively associated with real (or possible) calls through the link. For example, the real link AB, carrying two real calls, is weighed as follows:

$$W_{AB}=\min\{(10*1+1), (10*2+1)\}=11;$$

The real link DC carrying one real call while having capacity C for two calls, is weighed as follows:

$$W_{DC} = \min\{(10*0+1), (10*3+1)\} = 1;$$

For a virtual link, the weight is determined as the minimal value selected from weights calculated for different groups of links enveloping the virtual link and used by respective continuous calls (call paths). For example, the virtual link AC should be weighed taking into account three call paths enveloping this link- two of them via two hops (ABC), and one via three hops (AEDC):

$$W_{AC} = \min\{(10*1+2), (10*2+2), (10*3+3)\} = 12;$$

Figure 4:
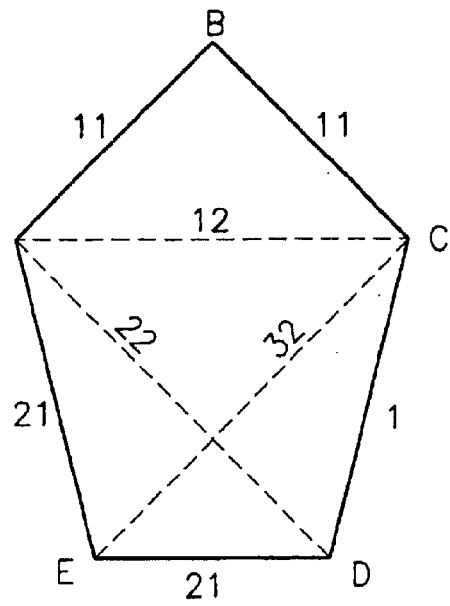
FIG. 4 illustrates the augmented graph of FIG. 2, where the edges are marked with their weights.

FIG. 4 shows the weighed augmented graph of the network before any new call enters. Let's now suppose that a new call having priority P2 enters and is to be placed between the end-points A and D in the network. As can be noticed, no free path (having "0" priority) exists between nodes A and D. Which path will be selected for placing the new call and what are the changes to be undertaken in the network for introducing the new call with minimal damage to the traffic presently taking place and minimal perturbations to the network? The attention is now directed to FIG. 5.

Figure 5:
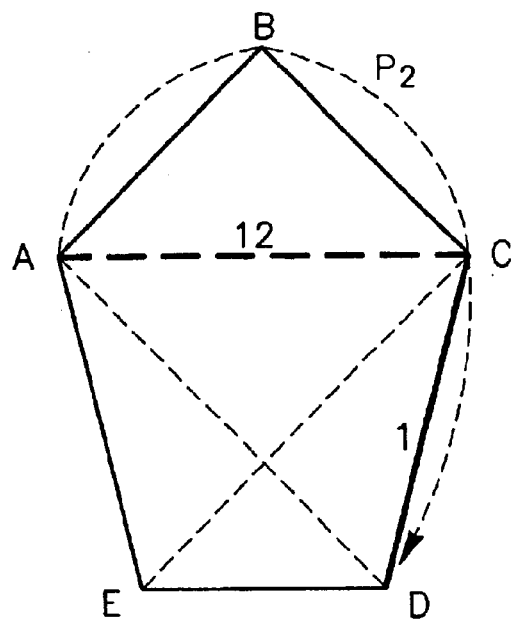
FIG. 5 illustrates the shortest path for routing a new call, found according to the invention in the augmented graph of FIG. 4, and the corresponding physical path in the network graph illustrated in FIG. 1.

FIG. 5 illustrates the solution of the above-formulated problem. To place the new call having priority P2 (shown by a dotted curve), the shortest path having the minimal weight has been found, connecting nodes A and D. It is the path (emphasized in bold) consisting of the virtual link AC weighed 12 and the real link CD weighed 1, the total weight of the path being 13. The real path for routing the new call will comprise the real link CD which has a spare facility for one new call, and two real links AB and BC which produced the weight "12" of the virtual link AC. This number also gives the answer to a question which call will be dropped from the links AB and BC: it will be the call with priority P1, which suits the criteria.

(The main criterion, stating that only calls with priority lower than that of the new call may be dropped, can either be checked at the end of the procedure, or considered at the beginning of the calculation. For example, edges having the minimal priority higher than that of the new call may be considered as non-existent in the augmented graph, i.e. prohibited in advance, since they cannot be used for new routing. The algorithm can therefore be simplified.)

Figure 6:
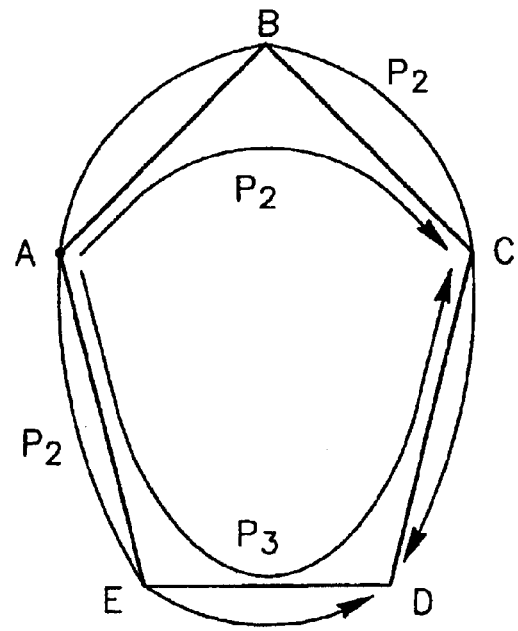
FIG. 6 shows the network graph conducting a new call after dropping one call with a lower priority.

FIG. 6 illustrates the network after the new call with priority P2 has been routed via the selected path by dropping one call with lower priority which previously took place via that path.

Figure 7:
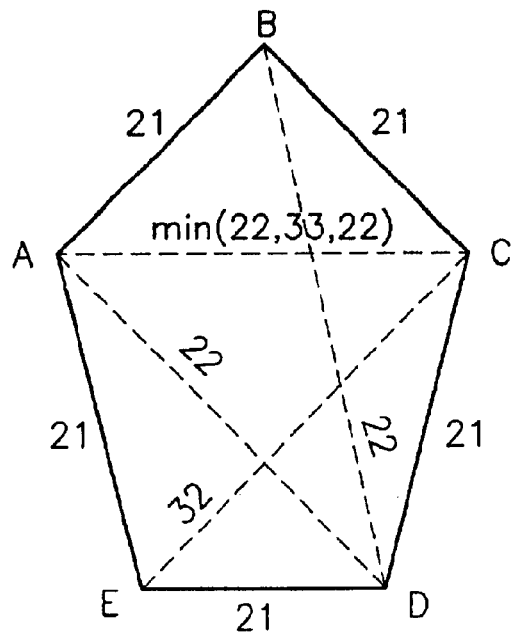
FIG. 7 illustrates the updated augmented graph after placing the new call.

FIG. 7 shows an augmented graph updated after changes, which have been made in the network. One may notice that the augmented graph have been updated only at a particular area thereof where the perturbations occurred in the network. The changes in the augmented graph comprise a) appearance of a new virtual link BD, and b) amendment of weights of all edges of the graph related to the path selected for routing of the new call. Other edges of the graph are unchanged. Such a feature speaks for efficacy of the method, which provides construction of the augmented graph only once; the graph is then utilized for determining optimal paths for new call(s) and partially updated whenever the new call(s) being placed (sometimes instead of previously held one(s)).

What is claimed is:

1. A method for routing of incoming telecommunication traffic, having priority, in a telecommunication network, the method comprising applying an algorithm of finding optimal path(s) to an augmented graph built for said telecommunication network and comprising nodes and edges, wherein the edges of the augmented graph are weighted to reflect priority of telecommunication traffic presently taking place there-through.

2. The method according to claim 1, wherein said telecommunication traffic comprises one or more calls of at least one type selected from a non-exhaustive list comprising voice, fax and data.

3. The method according to claim 1 or 2, wherein
said telecommunication network being represented as a network graph comprising nodes and real links each bridging a pair of the nodes, and
said augmented graph being a graph built on the basis of the network graph by adding to it virtual links; the nodes of the augmented graph constituting the nodes of the network graph; both real and virtual links being considered the edges of the augmented graph.

4. The method according to claim 2, comprising the following steps:
building the augmented graph of the telecommunication network,
weighting each edge of the augmented graph to reflect the priority of calls presently taking place there-through;
obtaining one or more new calls, each defined by end-point nodes and a particular priority;
applying a pathfinder optimization algorithm to the augmented graph to determine an optimal pathfinder solution, having the minimal total weight, for routing said one or more new calls in the augmented graph;
if said optimal pathfinder solution is determined, allocating corresponding to it links in the network graph for routing said one or more new calls in the telecommunication network;
providing for placing said one or more new calls via the allocated links by ensuring that, if necessary, call(s) having lower priorities and currently held by the allocated links be dropped therefrom;
updating the augmented graph to reflect changes in the network, and
returning to the step of obtaining one or more new calls.

5. The method according to claim 4, wherein the step of building the augmented graph includes building an optimal augmented graph by
defining call paths respectively used by the calls currently taking place in the network, said call paths being formed by nodes connected with real links, and
converting said call paths into complete sub-graphs, wherein each two nodes of any of said complete sub-graphs are connected with an edge being either a real link or a virtual link.

6. The method according to one of claims 4 and 5, wherein said changes in the network include at least one, selected from the following non-exhaustive list comprising:
adding said one or more new calls routed via one or more links;
dropping said one or more of previously held calls due to placing said one or more new calls,
terminating currently existing calls,
a failure of at least one link in the network,
reconsidering the length parameter of the links.

7. The method according to one of claims 4 and 5, comprising routing of one new call at a time, and wherein said pathfinder optimization algorithm is a shortest path algorithm for determining a shortest path between the endpoint nodes, said path comprising one or more component edges and being characterized by the minimal weight and the priority lower than that of the new call.

8. The method according to claim 7, wherein the weight of the shortest path is a sum of weights of the component edges, and the priority of the shortest path is considered to be the maximal among the priorities of the component edges.

9. The method according to claim 1, wherein lower priorities are designated with smaller numbers, and the absence of traffic is designated with the lowest priority, so that the less intensive and less significant the traffic via an edge, the smaller the priority and weight of the edge.

10. The method according to any one of claims 4 to 9 wherein the weighing is performed to also reflect a length parameter of the edges.

11. The method according to claim 10, wherein the length parameter is a function of at least one argument associated with a link and being selected from a non-exhaustive list comprising distance, tariff and administrative cost.

12. The method according to claim 9, wherein priority of any of the edges of the network is the minimal priority among those of calls passing or able to pass through the edge.

13. The method according to claim 9, wherein edges having the priority higher than that of a new call are considered non-existent in the augmented graph.

14. The method according to claim 1, wherein the weighting of edges of the augmented graph comprises determining a current weight W to each edge connecting nodes "x" and "y", wherein the current weight being considered the minimal weight among component weights of calls passing and able to pass via the edge; each of the component weights being a function of the respective call priority P and the length parameter L of the edge:

$$W_{xy} = \min \{W_{xy}^C\},$$

$$W_{xy}^C = k*P^C + L_{xy}^C;$$

where:

C—labels the number of calls able to pass through the edge (either virtual or physical) between nodes x and y, $W_{xy}^C$—designates a component weight of a call C over edge x, y, $P^C$—indicates the priority of a call C, and $L_{xy}^C$—designates the value of length parameter between nodes "x" and "y", along the path formed by the call C, k—is a coefficient.

15. The method according to claim 14, wherein the coefficient "k" reflects rules empirically set for the network, for managing calls having different priorities; the maximal value of said coefficient being calculated as the maximal number of possible calls of priority P in the network:

$$k_{max} = \frac{1}{2} N(N-1),$$

where N is the number of nodes in the network.

* * * * *